(12) United States Patent
Bauer et al.

(10) Patent No.: US 8,335,614 B2
(45) Date of Patent: Dec. 18, 2012

(54) METHOD FOR CONTROLLING A BELT PRETENSIONER AND SAFETY ARRANGEMENT COMPRISING A BELT PRETENSIONER

(75) Inventors: Klaus Bauer, Bad Kreuznach (DE); Simon Hesse, Westhofen (DE); Horst Kettern-Kohler, Buchen (DE); Ulrich Rick, Roxheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 764 days.

(21) Appl. No.: 11/996,717

(22) PCT Filed: Jul. 11, 2006

(86) PCT No.: PCT/EP2006/006748
§ 371 (c)(1),
(2), (4) Date: Aug. 12, 2008

(87) PCT Pub. No.: WO2007/014627
PCT Pub. Date: Feb. 8, 2007

(65) Prior Publication Data
US 2008/0300753 A1 Dec. 4, 2008

(30) Foreign Application Priority Data
Jul. 30, 2005 (DE) .................. 10 2005 035 862

(51) Int. Cl.
*B60R 22/00* (2006.01)
*E05F 15/00* (2006.01)
*G05D 1/00* (2006.01)
*G05D 3/00* (2006.01)
*G06F 7/00* (2006.01)
*G06F 17/00* (2006.01)

(52) U.S. Cl. .............. 701/45; 701/46; 701/72; 180/268; 180/181; 280/801.1; 280/806

(58) Field of Classification Search .................. 701/36, 701/45–47, 49, 70–72, 82, 124; 180/268, 180/271, 274, 281, 282; 280/734, 735, 801.1, 280/806, 807
See application file for complete search history.

(56) References Cited

U.S. PATENT DOCUMENTS

| 6,169,946 | B1 | 1/2001 | Griessbach |
| 6,394,495 | B1 | 5/2002 | Specht |
| 6,421,591 | B1 * | 7/2002 | Hackenberg ............... 701/45 |
| 6,618,656 | B2 * | 9/2003 | Kueblbeck et al. ........ 701/45 |
| 6,725,141 | B2 | 4/2004 | Relleke |

(Continued)

FOREIGN PATENT DOCUMENTS

DE 19736328 A1 2/1999

(Continued)

OTHER PUBLICATIONS

International Searching Authority, International Search Report for Application No. PCT/EP2006/006748, dated Oct. 6, 2006.

*Primary Examiner* — Thomas Tarcza
*Assistant Examiner* — Rami Khatib
(74) *Attorney, Agent, or Firm* — Ingrassia Fisher & Lorenz, P.C.

(57) ABSTRACT

The present invention relates to a method for controlling a reversible seat belt pretensioner in a motor vehicle, comprising the steps of detecting the speed and the steering angle of the vehicle, calculating an expected turning rate of the vehicle about its vertical axis from the speed and the steering angle and calculating an upper and a lower turning rate limiting value using the expected turning rate, detecting the actual turning rate of the vehicle about its vertical axis and activating the seat belt pretensioner of the vehicle if the actual turning rate of the vehicle is greater than the upper turning rate limiting value or is less than the lower turning rate limiting value. The present invention also relates to a safety arrangement for implementing the method according to the invention.

12 Claims, 3 Drawing Sheets

U.S. PATENT DOCUMENTS

| | | | |
|---|---|---|---|
| 6,755,274 B2 * | 6/2004 | Mattes et al. | 180/282 |
| 7,020,552 B2 | 3/2006 | Park | |
| 7,178,622 B2 * | 2/2007 | Eberle et al. | 180/271 |
| 7,403,848 B2 * | 7/2008 | Schubert et al. | 701/70 |
| 7,416,042 B2 | 8/2008 | Czaykowska et al. | |
| 2001/0054816 A1 | 12/2001 | Brambilla et al. | |
| 2003/0105569 A1 | 6/2003 | Roelleke | |
| 2004/0094349 A1 * | 5/2004 | Schumacher et al. | 180/274 |
| 2004/0128060 A1 | 7/2004 | Park | |
| 2004/0195030 A1 * | 10/2004 | Eberle et al. | 180/271 |
| 2006/0108787 A1 | 5/2006 | Czaykowska et al. | |
| 2006/0164227 A1 * | 7/2006 | Auer et al. | 340/457.1 |

FOREIGN PATENT DOCUMENTS

| | | |
|---|---|---|
| DE | 19811865 | 9/1999 |
| DE | 19961799 | 7/2001 |
| DE | 10005010 A1 | 8/2001 |
| DE | 10029061 | 1/2002 |
| DE | 10121386 C1 | 8/2002 |
| DE | 10230483 A1 | 1/2004 |
| DE | 10344835 A1 | 7/2004 |
| DE | 10065518 B4 | 10/2004 |
| DE | 10332024 | 2/2005 |
| DE | 10333990 A1 | 2/2005 |
| DE | 10345726 | 4/2005 |
| DE | 10337618 B3 | 5/2005 |
| DE | 102005035849 A1 | 2/2007 |
| DE | 102005035850 A1 | 2/2007 |
| DE | 102005035861 A1 | 2/2007 |
| DE | 102005035863 A1 | 2/2007 |
| WO | WO 2004039639 A1 * | 5/2004 |

* cited by examiner

METHOD FOR CONTROLLING A BELT PRETENSIONER AND SAFETY ARRANGEMENT COMPRISING A BELT PRETENSIONER

CROSS-REFERENCE TO RELATED APPLICATIONS

This application is a U.S. National-Stage entry under 35 U.S.C. §371 based on International Application No. PCT/EP2006/006748 filed Jul. 11, 2006, which was published under PCT Article 21(2) and which claims priority to German Application No. DE 10 2005 035 862.4, filed Jul. 30, 2005.

TECHNICAL FIELD

The present invention relates to a method for controlling a reversible seat belt pretensioner in a motor vehicle. The invention also relates to a safety arrangement for a motor vehicle comprising a reversible seat belt pretensioner.

BACKGROUND

Different safety arrangements are known in the prior art for motor vehicles. These arrangements routinely comprise a winding mechanism for automatically winding a seat belt around a belt reel. The automatic winding action ensures that the applied seat belt rests loosely and comfortably against the passenger's body and when the seat belt is not being used, it is wound up around the belt reel. The seat belt unwinds easily when it is put on, thereby ensuring freedom of movement of the passenger inside the vehicle.

Furthermore, so-called seat belt pretensioners are provided in known safety arrangements. The effect of seat belt pretensioners is to tighten the seat belt in order to pull the passenger against the backrest of the vehicle seat, thereby reducing the risk of injury in the event of a collision between the vehicle and another vehicle or a traffic obstacle. Known seat belt pretensioners can be classified as irreversible or reversible seat belt pretensioners. The irreversible seat belt pretensioner is only activated when an accident has already happened, for example a collision with another vehicle. Crash sensors detect the collision and transmit a corresponding activation signal to the irreversible seat belt pretensioner. Irreversible seat belt pretensioners can only ever be activated or released once, since an accident has definitely occurred. Reversible seat belt pretensioners, on the other hand, are intended to be able to be activated several times, even rapidly in succession, based on signals which indicate the possibility of an imminent crash. In other words, reversible seat belt pretensioners are always intended to be able to be activated when a crash is possible or likely, but has not yet actually taken place or been detected.

In the case of reversible seat belt pretensioners, a critical driving situation is not determined by crash sensors which only determine a crash when it has actually occurred, but by driving dynamics sensors which provide information about the current movement state of the motor vehicle. For example, this includes the determination of the longitudinal, lateral and vertical acceleration of the vehicle. If these measured values exceed a limiting value, then the preventative activation of the reversible seat belt pretensioner takes place. If the measured values fall short of the limiting value again and in fact, there has not been a crash, the reversible seat belt pretensioner is deactivated again so that the seat belt can be returned into its normal position in which the passenger is afforded a greater freedom of movement. It is possible to reactivate the reversible seat belt pretensioner in the next critical driving situation.

DE 199 61 799 B4 describes a seat belt system with a reversible seat belt pretensioner. The known reversible seat belt pretensioner has an electromotive drive which reversibly pretensions the seat belt into a intermediate safety position with a specific tensile force as a function of the probability of an accident situation derived from sensor signals. The critical driving situation which is detected by the precrash sensor technology (not described in more detail) and which leads to activation of the seat belt pretensioner can be, for example skidding, emergency braking etc.

DE 103 45 726 A1 describes a retention system for holding back a passenger in a car. The known retention system has a reversible seat belt pretensioner operated by a control device. The control device is connected to a vehicle situation detection device for dynamically detecting vehicle situation data, for example the lateral acceleration of the vehicle, and is connected to a passenger parameter detection device for dynamically detecting passenger parameter data, for example the weight of the passenger. The seat belt pretensioner is controlled as a function of the determined vehicle situation data and passenger parameter data.

DE 102 30 483 A1 describes a method for activating a two-stage irreversible seat belt pretensioner. In the known method, the longitudinal acceleration of the motor vehicle is detected and subjected to an integration whereby the integral of the acceleration is compared with a tripping threshold. If this tripping threshold is exceeded, the irreversible seat belt pretensioner is activated.

DE 103 32 024 A1 describes a method for activating a reversible seat belt pretensioner for releasing a belt pull-out stop of a retention belt in a motor vehicle, which may be activated by an acceleration sensor. The release time for the belt pull-out stop is established as a time when the detected acceleration falls below an acceleration threshold.

The known methods for controlling a reversible seat belt pretensioner have stood the test of time, but there is no suitable activation of the seat belt pretensioner during dangerous steering manoeuvres, so that passenger safety during dangerous steering manoeuvres is worth improving.

It is therefore an object of the present invention to provide a method for controlling a reversible seat belt pretensioner in a motor vehicle which allows a suitable activation of the seat belt pretensioner during dangerous steering manoeuvres, thereby increasing the safety of the vehicle occupants. A further object of the invention is to provide a safety arrangement comprising a reversible seat belt pretensioner with which it is possible to implement the method according to the invention.

SUMMARY

The method according to the invention for controlling a reversible seat belt pretensioner in a motor vehicle has the following method steps. First of all, the speed of the vehicle and the steering angle of the vehicle are detected. Next, the detected speed and steering angle are used to calculate an expected turning rate of the vehicle about its vertical axis. In so doing, the starting point may be, for example the ideal case in which the steering angle is converted exactly into the desired curve path, without resulting in oversteering or understeering. The expected turning rate may be, for example the angular velocity based on one rotation about the vertical axis. An upper and a lower turning rate limiting value is then calculated using the calculated expected turning rate. This may be accomplished, for example using a tolerance factor for the upper and respectively the lower turning rate limiting value. Thereafter, the actual turning rate of the vehicle is detected about its vertical axis. The actual turning rate and the upper or lower turning rate limiting value respectively are then compared. If the actual turning rate of the vehicle is greater than the upper turning rate limiting value or less than the lower turning rate limiting value, the seat belt pretensioner is activated.

The method according to the invention leads to an activation, suitable for the situation, of the seat belt pretensioner during dangerous steering manoeuvres. Oversteering or understeering the vehicle by exceeding or respectively falling below the upper or respectively lower turning rate limiting value is thus reliably detected and results in activation of the seat belt pretensioner.

In a preferred embodiment of the method according to the invention, the seat belt pretensioner is furthermore only activated when the actual turning rate of the vehicle is greater than or less than the upper or lower turning rate limiting value respectively for a predetermined period of time. In this way, it is ensured that the seat belt is only tightened in the event of an actually dangerous steering manoeuvre. A dangerous steering manoeuvre of this type does not usually exist when the turning rate limiting values are only exceeded or respectively fallen below for a short time.

In an advantageous embodiment of the method according to the invention, the predetermined period of time is established as a function of the speed of the vehicle. This measure allows a further preselection to be made as to whether a dangerous steering manoeuvre actually exists.

In a particularly advantageous embodiment of the method according to the invention, the higher the speed of the vehicle, the shorter the predetermined period of time. This takes into account the fact that a short-term oversteering or understeering at a high vehicle speed is more dangerous than a short-term oversteering or understeering at a low speed. The predetermined period of time may decrease, for example linearly or in steps, with an increasing speed.

As an oversteering or understeering at low vehicle speeds does not routinely constitute a dangerous situation, in a particularly preferred embodiment of the inventive method the seat belt pretensioner is furthermore only activated when the vehicle speed is higher than a predetermined speed limiting value. This could be established at for example 40 km/h.

In a particularly preferred embodiment of the inventive method, the upper or lower turning rate limiting value is calculated by multiplying the expected turning rate by a first or second tolerance factor respectively, the first tolerance factor being greater than 1 and the second tolerance factor being less than 1. Thus, the first tolerance factor could be, for example 1.6, while the second tolerance factor is set, for example at 0.75.

In an advantageous embodiment of the method according to the invention, the further method step of deactivating the activated seat belt pretensioner is provided when the actual turning rate of the vehicle is again less than the upper turning rate limiting value and greater than the lower turning rate limiting value.

The safety arrangement according to the invention will be described in the following, reference being made to the above description of the inventive method with respect to the advantages obtained herewith.

The safety arrangement according to the invention for a motor vehicle comprises a seat belt, a reversible seat belt pretensioner, a detection device for detecting the speed, the steering angle and the actual turning rate of the vehicle and a control device which is able to activate and deactivate the seat belt pretensioner. Activation and deactivation of the seat belt pretensioner is to be respectively understood as meaning the triggering operation and cancellation of the triggering operation. Furthermore, a calculation device is provided which is used to calculate an expected turning rate of the vehicle about its vertical axis from the speed and the steering angle and an upper and lower turning rate limiting value using the expected turning rate. The control device cooperates with the seat belt pretensioner such that the seat belt pretensioner is activated when the actual turning rate of the vehicle is greater than the upper turning rate limiting value or less than the lower turning rate limiting value.

In a preferred embodiment of the safety arrangement according to the invention, the control device cooperates with the seat belt pretensioner such that the seat belt pretensioner is furthermore only activated if the actual turning rate of the vehicle is greater or less than the upper or lower upper turning rate limiting value respectively for a predetermined period of time.

In a further preferred embodiment of the safety arrangement according to the invention, it is possible to vary the predetermined period of time as a function of the vehicle speed.

In an advantageous embodiment of the safety arrangement according to the invention, it is possible to shorten the predetermined period of time by increasing the vehicle speed.

In a further advantageous embodiment of the safety arrangement according to the invention, the control device cooperates with the seat belt pretensioner such that the seat belt pretensioner is furthermore only activated if the speed of the vehicle is higher than a predetermined speed limiting value.

In a preferred embodiment of the safety arrangement according to the invention, the calculation device is used to calculate the upper and respectively lower turning rate limiting value by multiplying the expected turning rate by a first and respectively second tolerance factor, the first tolerance factor being greater than 1 and the second tolerance factor being less than 1.

In a further advantageous embodiment of the safety arrangement according to the invention, the activated seat belt pretensioner can be deactivated when the actual turning rate of the vehicle is again less than the upper turning rate limiting value and greater than the lower upper turning rate limiting value.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
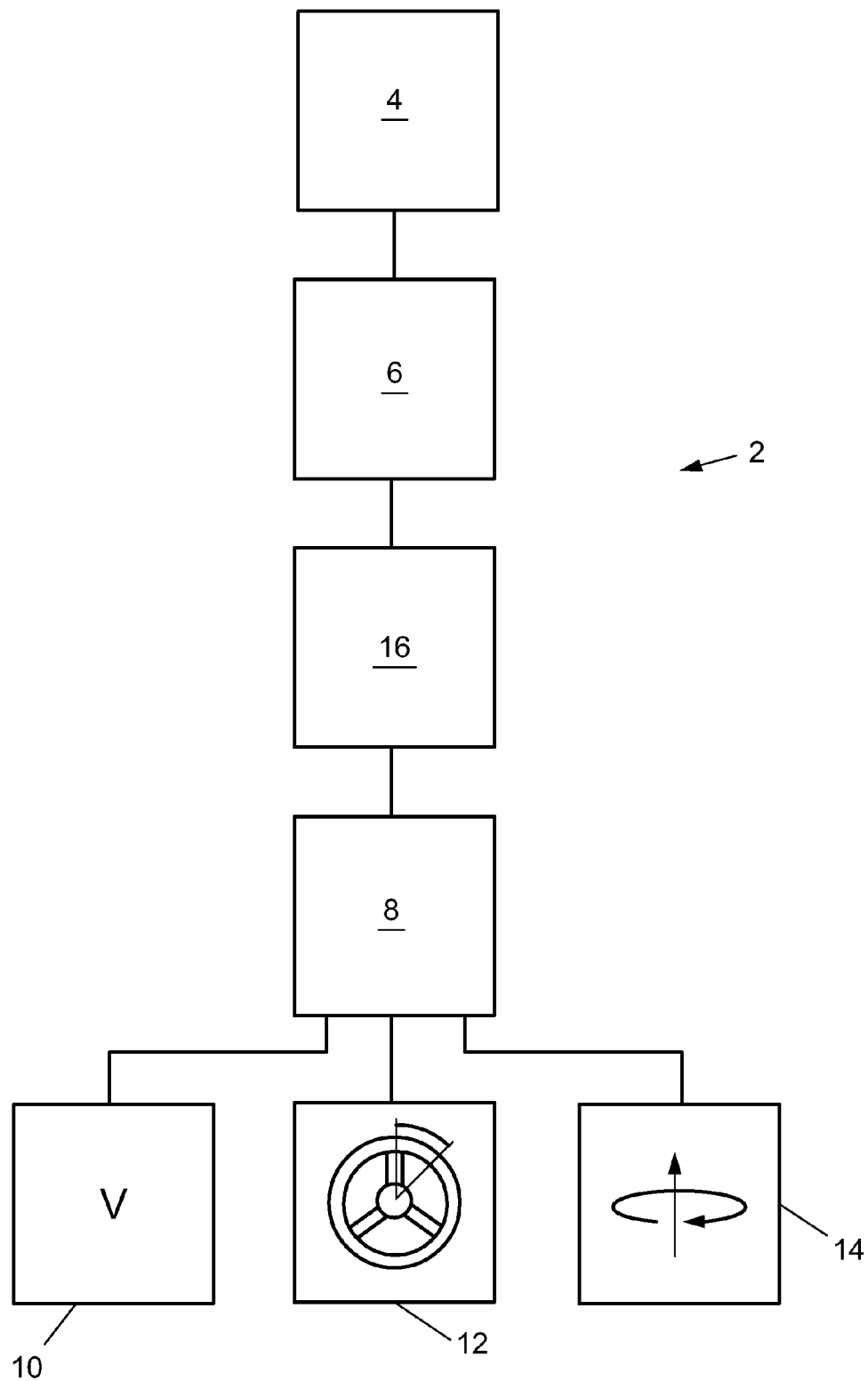
FIG. 1 is a schematic illustration of an embodiment of the safety arrangement according to the invention.

FIG. 1 is a schematic illustration of an embodiment of the safety arrangement 2 according to the invention. The safety arrangement 2 comprises a seat belt which is not shown in more detail. The seat belt can be tightened by a reversible seat belt pretensioner 4. The reversible seat belt pretensioner 4 is actively connected to a control device 6 so that the reversible seat belt pretensioner 4 can be activated and deactivated by the control device 6.

The safety arrangement 2 also comprises a detection device 8 for detecting the speed, the steering angle and the actual turning rate of the vehicle. For this purpose, the detection device 8 is connected to a speed sensor 10 to detect the speed of the vehicle, a steering angle sensor 12 to detect the steering angle of the vehicle and a turning rate sensor 14 to detect the actual turning rate of the vehicle. The speed sensor which is present anyway in the vehicle can be used as the speed sensor 10. The steering angle sensor 12 can detect, for example, the position of the steering wheel or the position of the vehicle wheels.

Furthermore, a calculation device 16 is provided which can be supplied with the detected speeds, steering angles and actual turning rates. On the one hand, the calculation device 16 is able to calculate an expected turning rate of the vehicle based on the detected steering angle and the vehicle speed. On the other hand, the calculation device 16 is able to calculate an upper and a lower turning rate limiting value using the expected turning rate. In so doing, the calculation device 16 uses so-called tolerance factors.

The data detected and calculated thus can be transmitted to the control device 6 where it is evaluated. The seat belt pretensioner 4 is activated by the control device 6 only when the vehicle speed is higher than a predetermined speed limiting value, the actual turning rate of the vehicle is greater than the upper turning rate limiting value or less than the lower turning rate limiting value and the actual turning rate of the vehicle is greater or less than the upper or lower turning rate limiting value for a predetermined period of time. The higher the vehicle speed, the shorter the predetermined period of time.

Figure 2:
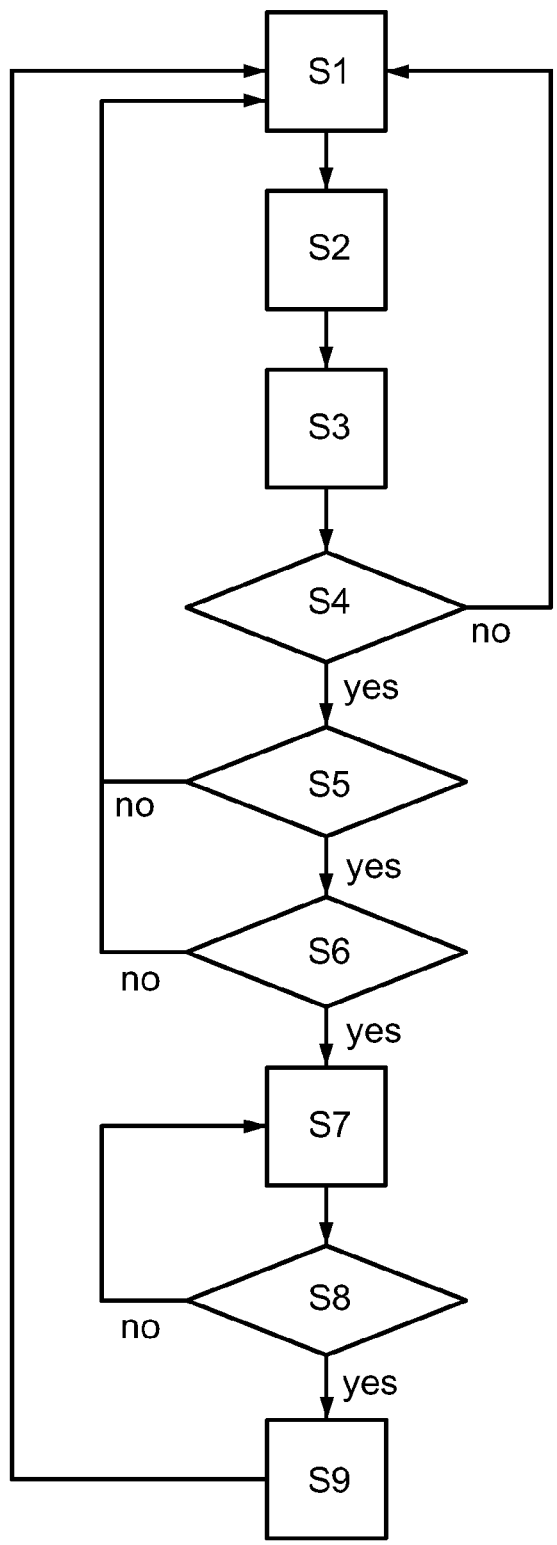
FIG. 2 shows a flow chart to explain an embodiment of the method according to the invention.

The inventive method on which the previously described safety arrangement 2 is based will be described in the following with reference to FIG. 2.

In a first method step S1, the detection device 8 detects the speed and the steering angle of the vehicle by means of the speed sensor 10 and the steering angle sensor 12.

In a following step S2, the calculation device 16 calculates the expected turning rate of the vehicle about its vertical axis. This is possible based simply on the detected steering angle and on the detected vehicle speed. The calculation of the expected turning rate consequently starts from the ideal situation, that is, the vehicle follows the desired steering direction, without being oversteered or understeered. An upper and a lower turning rate limiting value is then determined using the calculated expected turning rate. The upper turning rate limiting value is calculated by multiplying the expected turning rate by a first tolerance factor of 1.6 and the lower turning rate limiting value is calculated by multiplying the expected turning rate by a second tolerance factor of 0.75. In this manner, an envelope is produced over time around the expected turning rate, which will be discussed in more detail later on with reference to FIG. 3.

In a next step S3, the detection device 8 detects the actual turning rate of the vehicle by means of the turning rate sensor 14. It is pointed out that the actual turning rate as well as the steering angle and the speed of the vehicle are continuously detected to calculate therefrom the corresponding values mentioned above.

In step S4, an inquiry is made whether the detected speed of the vehicle is higher than a predetermined speed limiting value which, in the present example, was established at 40 km/h. If this is not the case, the sequence is restarted with step S1. However, if the detected speed is above the speed limiting value, the procedure is continued with step S5.

In step S5, an inquiry is made whether the actual turning rate of the vehicle is greater than the upper turning rate limiting value or less than the lower turning rate limiting value. If this is not the case, the procedure restarts at step S1. Otherwise, the procedure continues with step S6.

In step S6, here again, an inquiry is made, more specifically is checked, whether the actual turning rate of the vehicle has already been greater than or less than the upper or the lower turning rate limiting value for a predetermined period of time. If this is not the case, then steps S1 to S5 are initially repeated in order to then—after time has again elapsed—check again in step S6 whether the predetermined period of time has, in the meantime, been exceeded. If the predetermined period of time has been reached or exceeded, the procedure is continued with step S7.

In step S7, the control device 6 emits a corresponding signal to the seat belt pretensioner 4 which is activated on the signal so that the seat belt is tightened. In step S8, a check is made to ascertain whether the actual turning rate of the vehicle has fallen below the upper turning rate limiting value and exceeded the lower turning rate limiting value again. If this is not the case, the seat belt pretensioner 4 remains activated, otherwise it is deactivated in step S9 before the procedure recommences at step S1.

The mode of operation of the safety arrangement shown in FIG. 1 and of the method illustrated in FIG. 2 will be described in the following with reference to FIG. 3 using typical driving situations.

Figure 3:
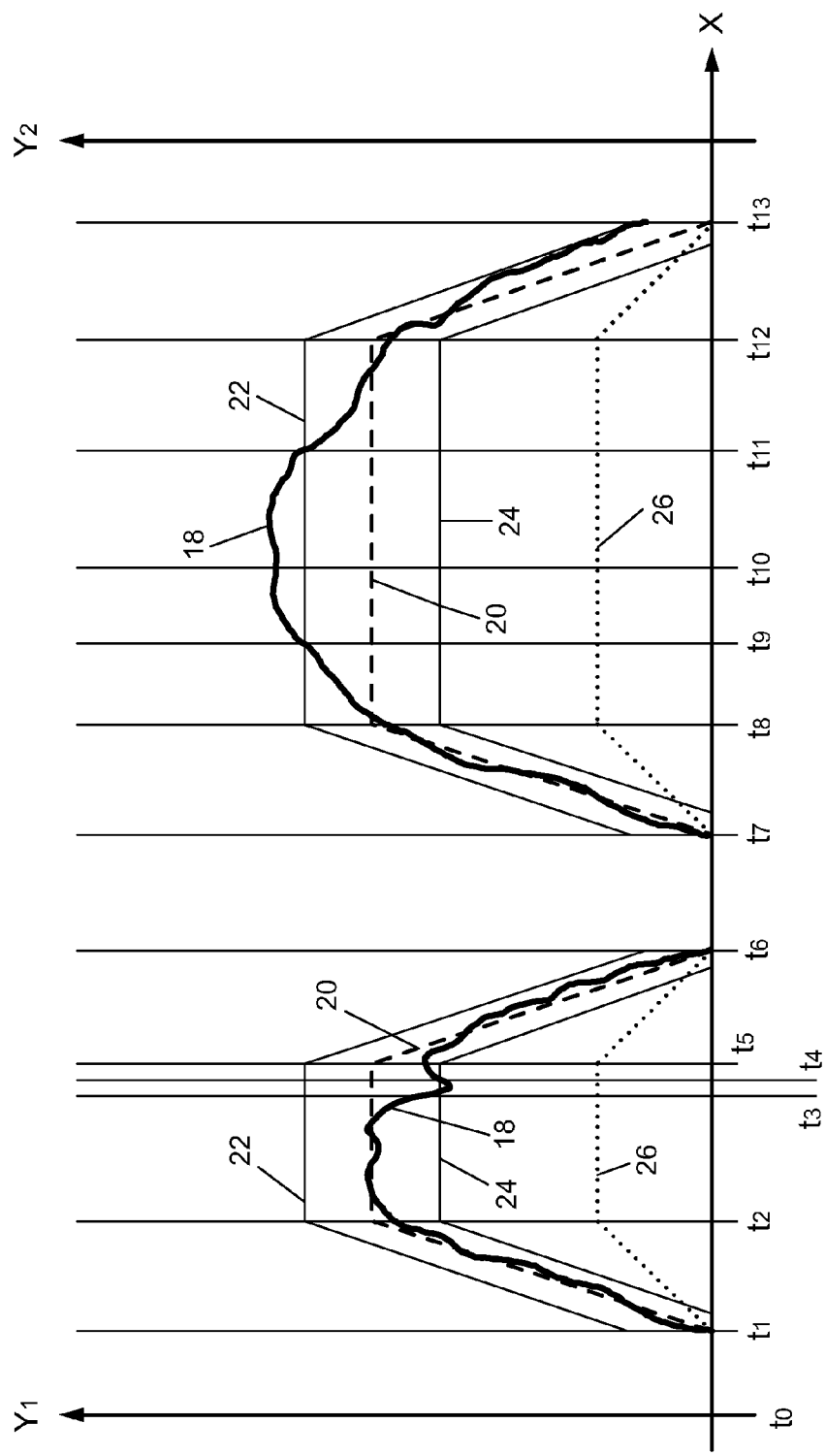
FIG. 3 shows a diagram to explain the method according to the invention in specific driving situations.

In FIG. 3, plotted on the X axis is the driving time, on the Y1 axis is the actual turning rate as well as the upper turning rate limiting value, the lower turning rate limiting value and the expected turning rate and on the Y2 axis is the steering angle, reference numeral 18 denoting the path of the actual turning rate, reference numeral 20 denoting the path of the expected turning rate, reference numerals 22 or 24 denoting the path of the upper or lower turning rate limiting value and reference numeral 26 denoting the path of the steering angle. It is assumed that, for the entire time, the vehicle moves at a speed which is above the predetermined speed limiting value.

During the time period t0 to t1, the vehicle travels without the driver making a steering manoeuvre. At time t2, the driver starts to turn the steering wheel until it has reached the desired steering position at time t3. As may be seen from FIG. 3, accordingly the expected turning rate 20 of the vehicle also increases, the curve of the expected turning rate 20 being continuously surrounded by an envelope consisting of the upper turning rate limiting value 22 and the lower turning rate limiting value 24. Between times t3 and t4, the vehicle greatly understeers, for example by the turned wheels slipping on the road surface, such that the actual turning rate 18 is less than the lower turning rate limiting value 24. The duration between the times t3 and t4 is, however, shorter than the predetermined period of time, so that the seat belt pretensioner 4 is not activated. Between times t5 and t6, the driver returns the steering wheel from the turned position back into the original position and only drives straight ahead until time t7, without locking the steering wheel.

Between times t7 and t13, the driver makes the same steering movement as between times t1 and t6. However, this time, due to the condition of the road surface or the like, the vehicle oversteers in that the rear end of the vehicle swings out.

Consequently, this means that the actual turning rate 18 between times t9 and t11 is greater than the upper turning rate limiting value 22. At time t10, the predetermined period of time during which the actual turning rate is allowed to be greater than the upper turning rate limiting value, is exceeded, i.e. the seat belt pretensioner 4 is activated at time t10.

When the actual turning rate 18 is less than the upper turning rate limiting value 22 again, as at time t11 in this case, the seat belt pretensioner is deactivated again.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A method for controlling a reversible seat belt pretensioner in a motor vehicle, comprising the steps:
   detecting the speed and the steering angle of the vehicle;
   calculating an expected turning rate of the vehicle about its vertical axis from the speed and the steering angle;
   calculating an upper and a lower turning rate limiting value using the expected turning rate;
   detecting the actual turning rate of the vehicle about its vertical axis; and
   activating the seat belt pretensioner of the vehicle if the actual turning rate of the vehicle is greater than the upper turning rate limiting value or is less than the lower turning rate limiting value wherein the seat belt pretensioner is only activated if the actual turning rate of the vehicle is greater than or less than the upper or lower turning rate limiting value respectively for a predetermined period of time.

2. The method according to claim 1, wherein the predetermined period of time is established as a function of the speed of the vehicle.

3. The method according to claim 2, wherein the higher the vehicle speed, the shorter the predetermined period of time.

4. The method according to claim 1, wherein the seat belt pretensioner is only activated if the speed of the vehicle is higher than a predetermined speed limiting value.

5. The method according to claim 1, wherein the upper or lower turning rate limiting value is calculated by multiplying the expected turning rate by a first or second tolerance factor respectively, the first tolerance factor being greater than 1 and the second tolerance factor being less than 1.

6. The method according to claim 1, further comprising the step of deactivating the activated seat belt pretensioner when the actual turning rate of the vehicle is again less than the upper turning rate limiting value and greater than the lower turning rate limiting value.

7. A safety arrangement for a motor vehicle comprising:
   a reversible seat belt pretensioner;
   a detection device for detecting the speed, the steering angle and the actual turning rate of the vehicle; and
   a control device by means of which it is possible to activate and deactivate the seat belt pretensioner, wherein a calculation device is provided by means of which it is possible to calculate an expected turning rate of the vehicle about its vertical axis from the speed and the steering angle and an upper and lower turning rate limiting value using the expected turning rate, wherein the control device cooperates with the seat belt pretensioner such that it is possible to activate the seat belt pretensioner if the actual turning rate of the vehicle is greater than the upper turning rate limiting value or less than the lower turning rate limiting value, wherein it is only possible to activate the seat belt pretensioner if the actual turning rate of the vehicle is greater than, or less than, the upper, or lower, turning rate limiting value respectively for a predetermined period of time.

8. The safety arrangement according to claim 7, wherein the predetermined period of time can be varied as a function of the speed of the vehicle.

9. The safety arrangement according to claim 8, wherein the predetermined period of time can be reduced by increasing the speed of the vehicle.

10. The safety arrangement according to claim 7, wherein it is only possible to activate the seat belt pretensioner, when the speed of the vehicle is higher than a predetermined speed limiting value.

11. The safety arrangement according to claim 7, wherein it is possible to calculate the upper, or the lower, turning rate limiting value by multiplying the expected turning rate with a first, or a second, tolerance factor respectively, the first tolerance factor being greater than 1 and the second tolerance factor being less than 1.

12. The safety arrangement according to claim 7, wherein it is possible to deactivate the activated seat belt pretensioner when the actual turning rate of the vehicle is again less than the upper turning rate limiting value and greater than the lower turning rate limiting value.

* * * * *